United States Patent
Zeng et al.

(10) Patent No.: US 7,617,176 B2
(45) Date of Patent: Nov. 10, 2009

(54) QUERY-BASED SNIPPET CLUSTERING FOR SEARCH RESULT GROUPING

(75) Inventors: Hua-Jun Zeng, Beijing (CN); Qicai He, Beijing (CN); Guimei Liu, Hong Kong (CN); Zheng Chen, Beijing (CN); Benyu Zhang, Beijing (CN); Wei-Ying Ma, Beijing (CN)

(73) Assignee: Microsoft Corporation, Redmond, WA (US)

( * ) Notice: Subject to any disclaimer, the term of this patent is extended or adjusted under 35 U.S.C. 154(b) by 484 days.

(21) Appl. No.: 10/889,841

(22) Filed: Jul. 13, 2004

(65) Prior Publication Data
US 2006/0026152 A1  Feb. 2, 2006

(51) Int. Cl.
*G06F 7/00* (2006.01)
(52) U.S. Cl. ............... 707/1; 707/100; 707/200
(58) Field of Classification Search ......... 707/1–7, 707/200, 100
See application file for complete search history.

(56) References Cited

U.S. PATENT DOCUMENTS

| | | | |
|---|---|---|---|
| 5,870,740 A * | 2/1999 | Rose et al. ............ 707/5 |
| 5,875,446 A | 2/1999 | Brown et al. |
| 5,937,422 A * | 8/1999 | Nelson et al. ........ 715/531 |
| 6,006,218 A | 12/1999 | Breese et al. |
| 6,041,323 A * | 3/2000 | Kubota ............... 707/5 |
| 6,128,613 A * | 10/2000 | Wong et al. .......... 707/7 |
| 6,134,541 A * | 10/2000 | Castelli et al. ........ 707/2 |
| 6,167,397 A * | 12/2000 | Jacobson et al. ....... 707/5 |
| 6,240,378 B1 * | 5/2001 | Imanaka et al. ........ 704/9 |
| 6,256,623 B1 | 7/2001 | Jones |
| 6,321,226 B1 | 11/2001 | Garber et al. |
| 6,363,373 B1 | 3/2002 | Steinkraus et al. |
| 6,370,527 B1 * | 4/2002 | Singhal ............... 707/6 |
| 6,470,307 B1 * | 10/2002 | Turney ............... 704/9 |
| 6,473,753 B1 * | 10/2002 | Katariya et al. ........ 707/4 |
| 6,523,021 B1 | 2/2003 | Monberg et al. |
| 6,549,897 B1 | 4/2003 | Katariya et al. |
| 6,567,936 B1 * | 5/2003 | Yang et al. ........... 714/37 |
| 6,578,032 B1 | 6/2003 | Chandrasekar et al. |
| 6,606,659 B1 * | 8/2003 | Hegli et al. ........... 709/225 |
| 6,704,729 B1 | 3/2004 | Klein et al. |
| 6,728,752 B1 * | 4/2004 | Chen et al. ........... 709/203 |
| 6,748,387 B2 | 6/2004 | Garber et al. |
| 6,766,320 B1 | 7/2004 | Wang et al. |
| 6,775,666 B1 | 8/2004 | Stumpf et al. |
| 6,816,850 B2 * | 11/2004 | Culliss .............. 707/1 |
| 6,895,552 B1 * | 5/2005 | Balabanovic et al. ... 715/513 |
| 6,920,448 B2 * | 7/2005 | Kincaid et al. ........ 707/3 |
| 6,944,612 B2 * | 9/2005 | Roustant et al. ....... 707/3 |
| 6,978,275 B2 * | 12/2005 | Castellanos et al. .... 707/102 |

(Continued)

OTHER PUBLICATIONS

Krishnapuram et al., Low-Complexity Fuzzy Relational Clustering Algorithms for Web Mining, Aug. 2001, IEEE, vol. 9, Issue 4, pp. 595-607.*

(Continued)

*Primary Examiner*—Apu M Mofiz
*Assistant Examiner*—Jessica N Le
(74) *Attorney, Agent, or Firm*—Lee & Hayes, PLLC

(57) ABSTRACT

A clustering architecture that dynamically groups the search result documents into clusters labeled by phrases extracted from the search result snippets. Documents related to the same topic usually share a common vocabulary. The words are first clustered based on their co-occurrences and each cluster forms a potentially interesting topic. Keywords are chosen and then clustered by counting co-occurrences of pairs of keywords. Documents are assigned to relevant topics based on the feature vectors of the clusters.

13 Claims, 11 Drawing Sheets

U.S. PATENT DOCUMENTS

| | | | |
|---|---|---|---|
| 7,017,114 B2 * | 3/2006 | Guo et al. | 715/531 |
| 7,047,482 B1 * | 5/2006 | Odom | 715/500 |
| 7,162,468 B2 * | 1/2007 | Schwartz et al. | 707/3 |
| 7,287,012 B2 * | 10/2007 | Corston et al. | 706/12 |
| 7,349,899 B2 * | 3/2008 | Namba | 707/6 |
| 2001/0020238 A1 * | 9/2001 | Tsuda | 707/5 |
| 2001/0049700 A1 * | 12/2001 | Ichikura | 707/512 |
| 2002/0035573 A1 * | 3/2002 | Black et al. | 707/104.1 |
| 2002/0042793 A1 * | 4/2002 | Choi | 707/6 |
| 2002/0052894 A1 * | 5/2002 | Bourdoncle et al. | 707/513 |
| 2002/0055936 A1 * | 5/2002 | Cheng et al. | 707/104.1 |
| 2002/0194166 A1 * | 12/2002 | Fowler | 707/3 |
| 2003/0023600 A1 * | 1/2003 | Nagamura et al. | 707/10 |
| 2003/0126235 A1 | 7/2003 | Chandrasekar et al. | |
| 2003/0140033 A1 * | 7/2003 | Iizuka et al. | 707/1 |
| 2003/0144994 A1 * | 7/2003 | Wen et al. | 707/3 |
| 2004/0015461 A1 * | 1/2004 | Lo | 706/25 |
| 2004/0111438 A1 * | 6/2004 | Chitrapura et al. | 707/200 |
| 2004/0225667 A1 * | 11/2004 | Hu et al. | 707/100 |
| 2005/0022106 A1 * | 1/2005 | Kawai et al. | 715/500 |
| 2005/0108200 A1 * | 5/2005 | Meik et al. | 707/3 |
| 2005/0144158 A1 * | 6/2005 | Capper et al. | 707/3 |
| 2006/0117003 A1 * | 6/2006 | Ortega et al. | 707/4 |
| 2007/0073748 A1 * | 3/2007 | Barney | 707/101 |
| 2007/0185866 A1 * | 8/2007 | Evans | 707/5 |
| 2008/0189253 A1 * | 8/2008 | Oliver et al. | 707/3 |

OTHER PUBLICATIONS

Indurkhya et al., Solving Regression Problems with Rule-based Ensemble Classifiers, Aug. 2001, ACM, pp. 287-292.*

Vlachos et al., Indentifying Similarities, Periodicities and Bursts for Online Search Queries, Jun. 13-18 2004, ACM, pp. 1-12.*

Bing Liu, et al., Mining Topic-Specific Concepts and Definitions on the Web, WWW 2003, May 2003, pp. 251-260, ACM, Budapest, Hungary.

Hua-Jun Zeng, et al., Learning to Cluster Web Search Results, SIGIR '04, Jul. 25-29, 2004, pp. 210-217, ACM.

Yitong Wang, et al., Evaluating Contents-Link Coupled Web Page Clustering for Web Search Results, CIKM '02, Nov. 2002, pp. 499-506, ACM, McLean, VA.

Krishna Kummamuru, et al., A Hierarchical Monothetic Document Clustering Algorithm for Summarization and Browsing Search Results, WWW 2004, May 2004, pp. 658-665, ACM, New York, NY.

Michael Chau, et al., Personalized Spiders for Web Search and Analysis, JCDL '01, Jun. 2001, pp. 79-87, ACM, Roanoke, VA.

Sougata Mukherjea, et al., Using Clustering and Visualization for Refining the Results of a WWW Image Search Engine, NPIV 98, 2000, pp. 29-35, ACM, Bethesda, MD.

Manuel J. Mana-Lopez, et al., Multidocument Summarization: An Added Value to Clustering in Interactive Retrieval, ACM Transactions on Information Systems, Apr. 2004, pp. 215-241, vol. 22 No. 2. ACM.

Oren Zamir, et al., Web Document Clustering: A Feasibility Demonstration, SIGIR '98, 1998, pp. 46-54, ACM, Melbourne, Australia.

Yi-Fang Brook Wu, et al., Finding More Useful Information Faster from Web Search Results, CIKM '03, Nov. 2003, pp. 568-571, ACM, New Orleans, Louisiana.

Eui-Hong Han, et al., Intelligent Metasearch Engine for Knowledge Management, CIKM '03, Nov. 2003, pp. 492-495, ACM, New Orleans, Louisiana.

Maria Halkidi, et al., Thesus: Organizing Web Document Collections Based on Link Semantics, The VLDB Journal, 2003, pp. 320-332, vol. 12, Springer-Vertag.

Dmitri Roussinov, et al., Visualizing Internet Search Results with Adaptive Self-Organizing Maps, SIGIR '99, 1999, p. 336, ACM, Berkley, CA.

Hwee-Leng Ong, et al., FOCI: Flexible Organizer for Competitive Intelligence, CIKM '01, Nov. 2001, pp. 523-525, ACM, Atlanta, GA.

* cited by examiner

WEBCLUSTERING

File  Edit  View  Search  Help

MSN  | jaguar |

Jaguar

. Jaguar Cats (38)

. Panthera onca (18)

. Mac OS (29)

. Big Cats (15)

. Clubs (20)

. Others (30)

1. Jaguar – Woodland Park Zoo Animal Facts
Features classification and range of the jaguar. Learn about their life cycle, diet, reproduction and habitat, view picture.
http://www.zoo.org/educate/fact_sheets/jaguar.htm 2. Wild Ones, The – Jaguar
Powerful feline is the only roaring cat in the Americas. Learn about its behavior, diet, and habitat.
http://www.thewildones.org/Animals/jaguar.html 3. ThinkQuest – The Wild Habitat. Jaguar
Along with a photo of this striking animal, this profile discusses physical charactersitics, hunting, feeding, and reproductive behavior.
http://library.thinkquest.org/11234/jaguar_any.html 4. Big Cats On-line
Learn about the better and lesser known wild cats. With facts and figures, a glossary, information about conservation, and a family tree.
http://dialspace.dial.pipex.com/agarman Done | | Time

FIG. 6

QUERY-BASED SNIPPET CLUSTERING FOR SEARCH RESULT GROUPING

TECHNICAL FIELD

This invention is related to data searching, and more specifically, for processing search results using data clustering.

BACKGROUND OF THE INVENTION

Users of search engines (e.g., web search engines) are often forced to sift through a long ordered list of search results in the form of documents, snippets, or text fragments, a time-consuming and inconvenient prospect in order to identify relevant topics inside the results. Existing search engines such as Google™, Yahoo™, and MSN™ often return a review the list and examine the titles and (short) snippets sequentially in order to identify their desired results. This is an even more time consuming task when multiple sub-topics of the given query are mixed together. For example, when a user submits a query "jaguar" into Google and wants to get search results related to "big cats", he or she might need to go to the $10^{th}$, $11^{th}$, $32^{nd}$, and/or $71^{st}$ results.

A possible solution to this problem is to (online) cluster search results into different groups, and to enable users to identify their required group at a glance. Clustering methods do not require pre-defined categories as in classification methods. Thus, these methods are more adaptive for various types of queries. Nevertheless, clustering methods are more challenging than classification methods because they are conducted fully unsupervised. Moreover, most traditional clustering algorithms are infeasible for search result clustering, because of some practical issues. For example, the algorithm should take document snippets as input instead of the whole document, as downloading of the original document is time-consuming. The clustering algorithm should also be fast enough for online calculation. The generated clusters should have readable descriptions for quick browsing by users, etc.; however, traditional clustering techniques are inadequate because they do not generate clusters with highly readable names.

The IR (Information Retrieval) community has explored document clustering as an alternative method of organizing retrieval results, but clustering has yet to be deployed on most major search engines. Some of them apply traditional clustering algorithms that first cluster documents into topically coherent groups based on content similarity, and then generate descriptive summaries for clusters. However, these summaries are often unreadable, which make it difficult for Web users to identify relevant clusters.

Challenges within the snippet clustering problem include limited data (in the form of, for example, a URL (Universal Resource Locator), a title, and one or more snippets), speed (the clustering of several hundred snippets in a very short period of time, e.g., few seconds), and browsable summaries (the user needs to determine at a glance whether a cluster is of interest; therefore, the architecture needs to provide concise and accurate descriptions of the clusters).

SUMMARY OF THE INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

Organizing web search results into clusters facilitates quick browsing through search results by the user. The architecture of the present invention reformalizes the clustering problem as a salient phrase ranking problem.

The present invention disclosed and claimed herein, in one aspect thereof, comprises an improved clustering method for dynamically grouping the search results into clusters labeled by phrases extracted from the snippets. Given a query and a ranked list of documents (typically a list of titles and snippets) returned by a certain search engine, salient phrases are extracted and ranked as candidate cluster names, based on a regression model that learns from human labeled training data. The documents are assigned to relevant salient phrases to form candidate clusters, and the final clusters are generated by merging these candidate clusters.

A frequent itemset method is employed to identify topics inside the snippets first, then classify all the snippets into those topics, and finally, rank the topics in an appropriate order that is easy for the user to browse. Words are first clustered based on their co-occurrences and each cluster forms a potentially interesting topic. Documents related to the same topic usually share a common vocabulary. Keywords are chosen and then clustered by counting co-occurrences of pairs of keywords. Documents are assigned to relevant topics based on the feature vectors of the clusters.

The novel phrase extraction process is similar to the conventional Suffix Tree Clustering, however, in at least one way, it differs in that several additional important properties are calculated to identify salient phrases. Moreover, the present invention utilizes learning methods to rank these salient phrases. Additionally, the present invention differs for conventional topic finding and/or text trend analysis, in that titles and short snippets are provided rather than whole documents. Moreover, the regression model is trained for the ranking of cluster names, which is closely related to the efficiency of user browsing.

In one aspect of the present invention, the clustering methodology is suited for Web search results clustering because of the efficiency in identifying relevant clusters for Web users. Short and readable cluster names are generated that enable users to quickly identify the topics of a specified cluster. Furthermore, the clusters are ranked according to their salience scores, thus, the more likely clusters required by users are ranked higher.

To the accomplishment of the foregoing and related ends, certain illustrative aspects of the invention are described herein in connection with the following description and the annexed drawings. These aspects are indicative, however, of but a few of the various ways in which the principles of the invention can be employed and the present invention is intended to include all such aspects and their equivalents. Other advantages and novel features of the invention will become apparent from the following detailed description of the invention when considered in conjunction with the drawings.

BRIEF DESCRIPTION OF THE DRAWINGS

FIG. 6 illustrates a screenshot of one example of a sample search result utilizing clustering in accordance with the present invention.

DETAILED DESCRIPTION OF THE INVENTION

Figure 1:
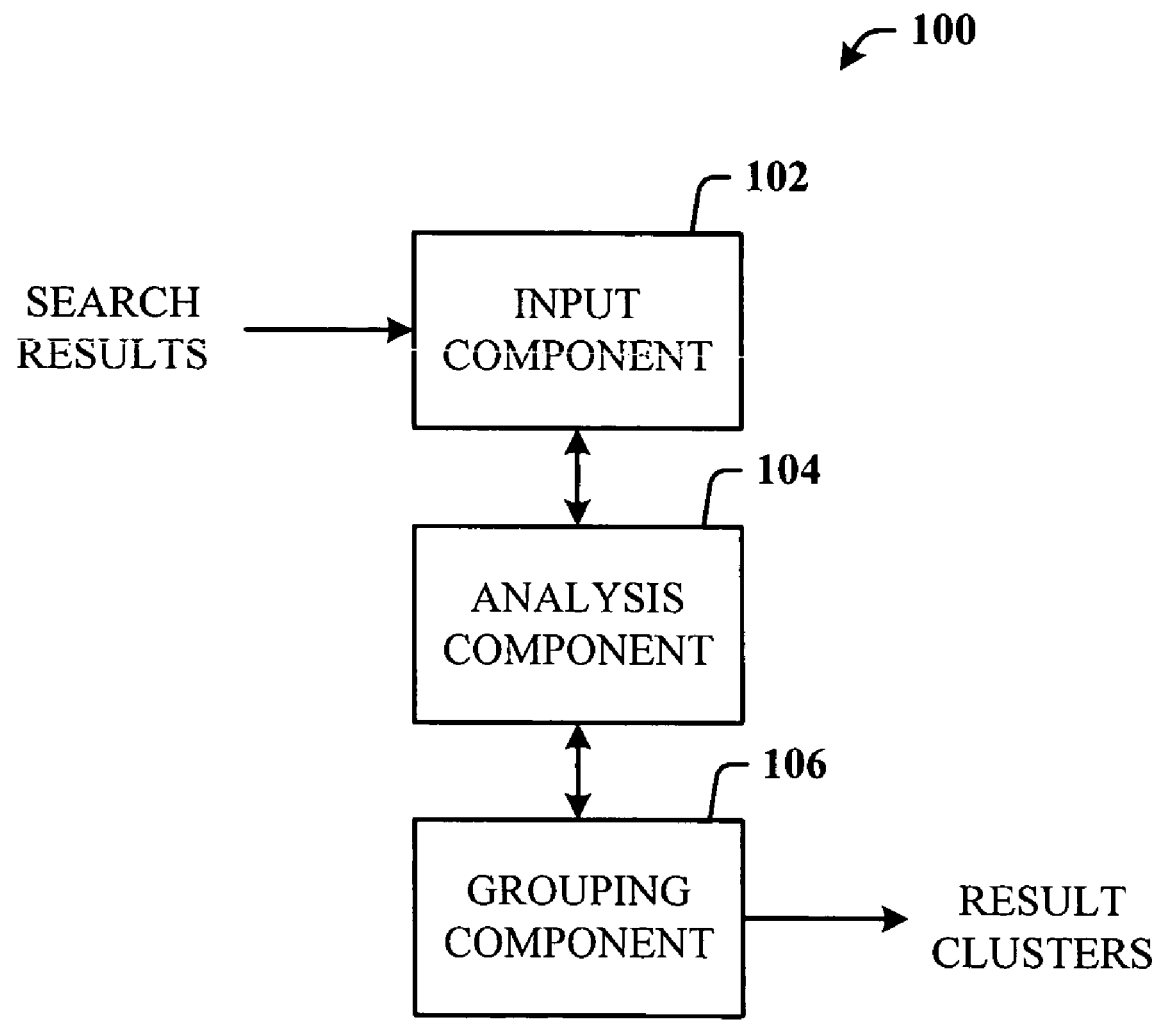
FIG. 1 illustrates a system that performs clustering in accordance with the present invention.

The present invention is now described with reference to the drawings, wherein like reference numerals are used to refer to like elements throughout. In the following description, for purposes of explanation, numerous specific details are set forth in order to provide a thorough understanding of the present invention. It may be evident, however, that the present invention can be practiced without these specific details. In other instances, well-known structures and devices are shown in block diagram form in order to facilitate describing the present invention.

As used in this application, the terms "component" and "system" are intended to refer to a computer-related entity, either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

As used herein, the term to "infer" or "inference" refer generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Referring now to FIG. 1, there is illustrated a system 100 that performs clustering in accordance with the present invention. The system 100 includes an input component 102 that receives search results from any of a number of conventional search engines, e.g., a web search engine. Given a query and a ranked list of documents (typically a list of titles and snippets of information) returned by the search engine, an analysis component 104 receives the results from the input component 102. The analysis component 104 extracts salient phrases and ranks the salient phrases as candidate cluster names. The analysis component 104 processes the salient phrases using a regression model that is trained from manually labeled training data. A grouping component 106 receives the candidate cluster names, assigns the input documents to relevant salient phrases to form candidate clusters. The grouping component 106 merges the candidate clusters to form final results clusters as an output.

Note that the functionality of the input component 102, analysis component 104, and grouping component 106 can be consolidated into a single or fewer components that perform all functions in accordance with the present invention.

Figure 2:
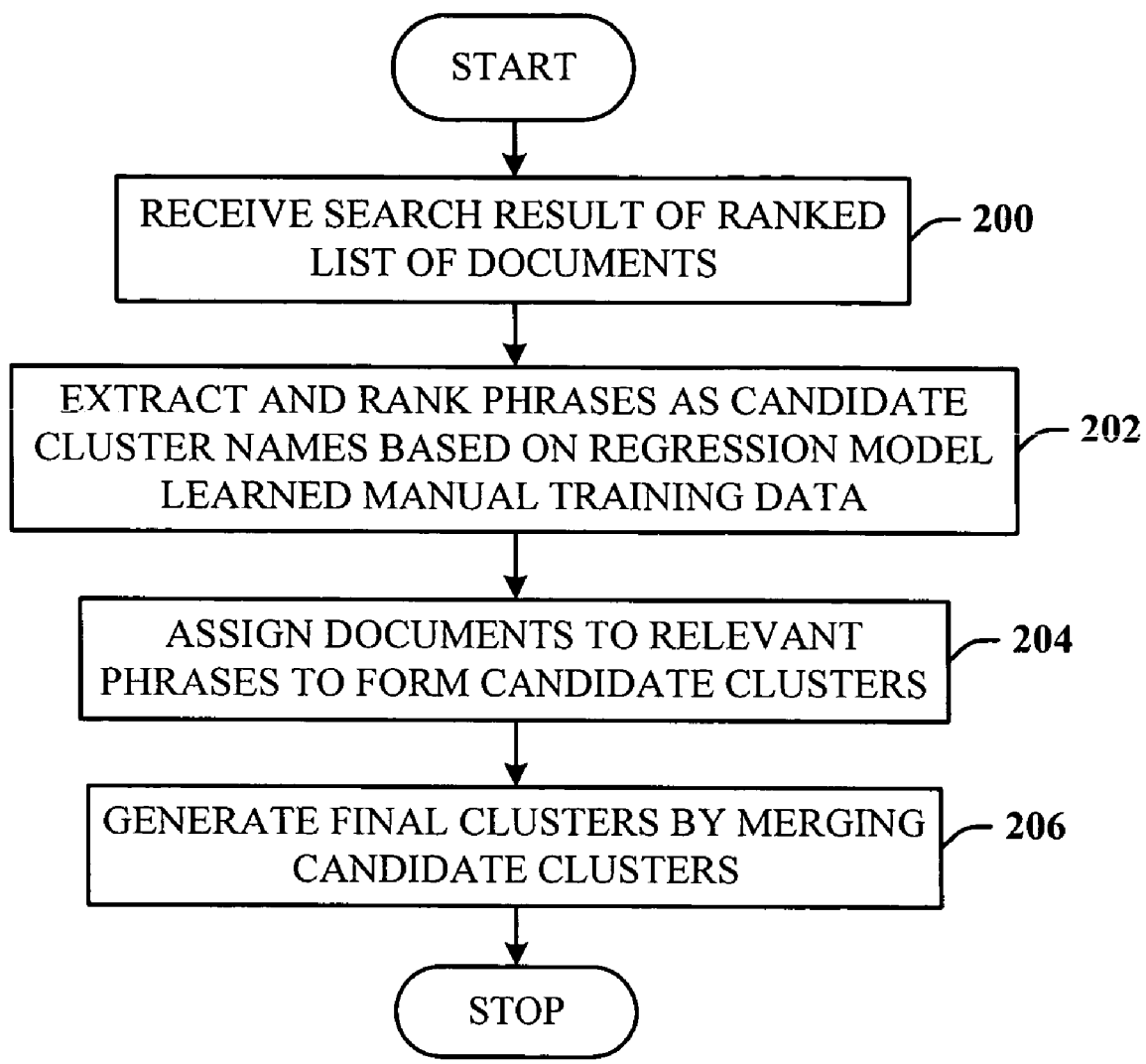
FIG. 2 illustrates a flow chart of one methodology for providing result clusters in accordance with the present invention.

Referring now to FIG. 2, there is illustrated a flow chart of one methodology for providing result clusters in accordance with the present invention. While, for purposes of simplicity of explanation, the one or more methodologies shown herein, e.g., in the form of a flow chart, are shown and described as a series of acts, it is to be understood and appreciated that the present invention is not limited by the order of acts, as some acts may, in accordance with the present invention, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the present invention.

At 200, search results are received in the form of a ranked list of documents. At 202, phrases are extracted from the documents and ranked as candidate cluster names using a trained regression model. At 204, the documents are assigned to relevant phrases to form candidate clusters. At 206, the candidate clusters are merged to generate the final result clusters. The process then reaches a Stop block.

Figure 3:
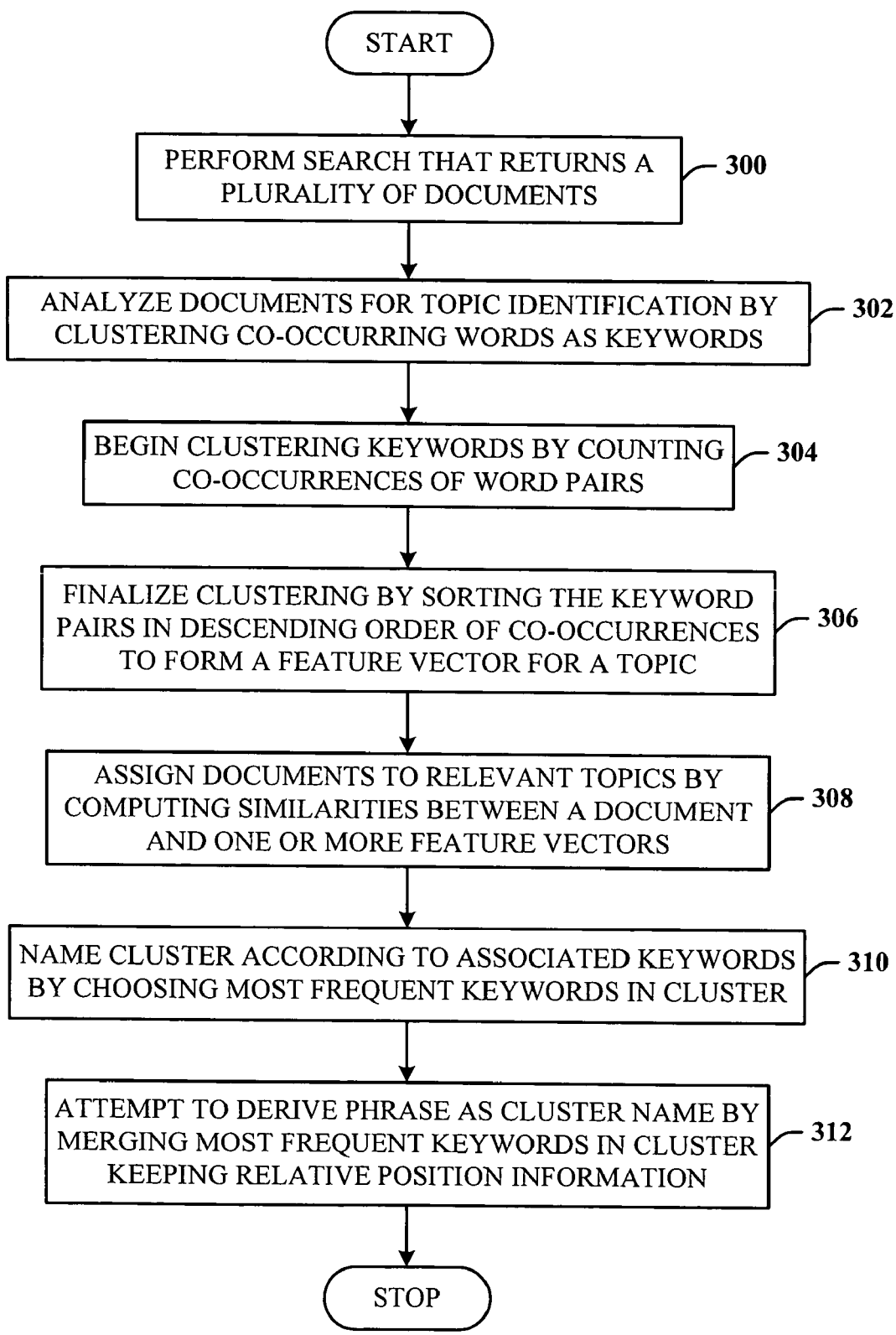
FIG. 3 illustrates a flow chart of one methodology for snippet clustering in accordance with the present invention.

Referring now to FIG. 3, there is illustrated a flow chart of one methodology for snippet clustering in accordance with the present invention. Documents of a same topic usually share a similar or common vocabulary, while many other words of the document vocabulary are considered irrelevant to the subject of the document (or "noise"). However, most of the documents returned by search engines are relevant to at least one topic, and in some cases more than one topic. In consideration thereof, the disclosed clustering architecture performs at least the following processes. At 300, a search is performed that returns one or more documents of information. At 302, the documents are analyzed for potential topic identification by clustering co-occurring words as keywords. At 304, keyword clustering begins by counting the co-occurrences of word pairs. Each cluster forms a potential interesting topic, since the keywords of a topic have to be frequent and central; that is, keywords appear frequently in documents that are relevant to the topic, and co-occur frequently with other keywords of the same topic. A word t is chosen as a keyword if, frequency(*t*)>=min_freq

||neighbor(*t*)||>=min_neighbor, where t' is a neighbor of t if frequency(t,t')>=min_cofreq.

At 306, pairs of the keywords are sorted in descending order of their co-occurrences. Accordingly, starting from the first pair (t1, t2), if(t1 is in cluster C and t2 does not belong to any cluster), then put t2 into cluster C;

if(t2 is in cluster C and t1 does not belong to any cluster), then put t1 into cluster C;

if(neither t1 nor t2 belongs to any cluster), then t1 and t2 form a new topic cluster; afterwards, all the keywords of a topic form a feature vector of the cluster.

At 308, documents are assigned to relevant topics, in which one document can belong to multiple clusters by first computing similarities between a document and the feature one or more vectors of the clusters. Accordingly, d={t1, t2, . . . , tn}

C={t1, t2', . . . , tm'} sim(*d,C*)=Σ*i*=1*n*Σ*j*=1*mf*(*ti,tj*')·freq(*ti*|*d*), where f(ti, tj')=1 if ti=tj', otherwise f(ti, tj')=0, and
where freq(ti|d) is the frequency of ti in document d.

A document d is put into a cluster C if sim(d, C)>=·αMax{sim(d, Ci)}.

At 310, the clusters are named using the associated keywords by choosing the most frequent words in a cluster as its name and generating a phrase as often as possible, since a phrase is better than a single word for cluster description. At 312, keywords co-occurring frequently are merged to form a phrase, while keeping relative position information when counting co-occurrences. Accordingly, words t1, t2, . . . , tm form a phrase t1 t2 . . . tm if, ∀*i,j*,freq(*ti,tj*)/freq(*ti*)>=min_merge_freq and freq(*ti, tj*)/freq(*tj*)>=min_merge_freq∀*i*<*j*,position(*ti*) <position(*tj*).

Figure 4:
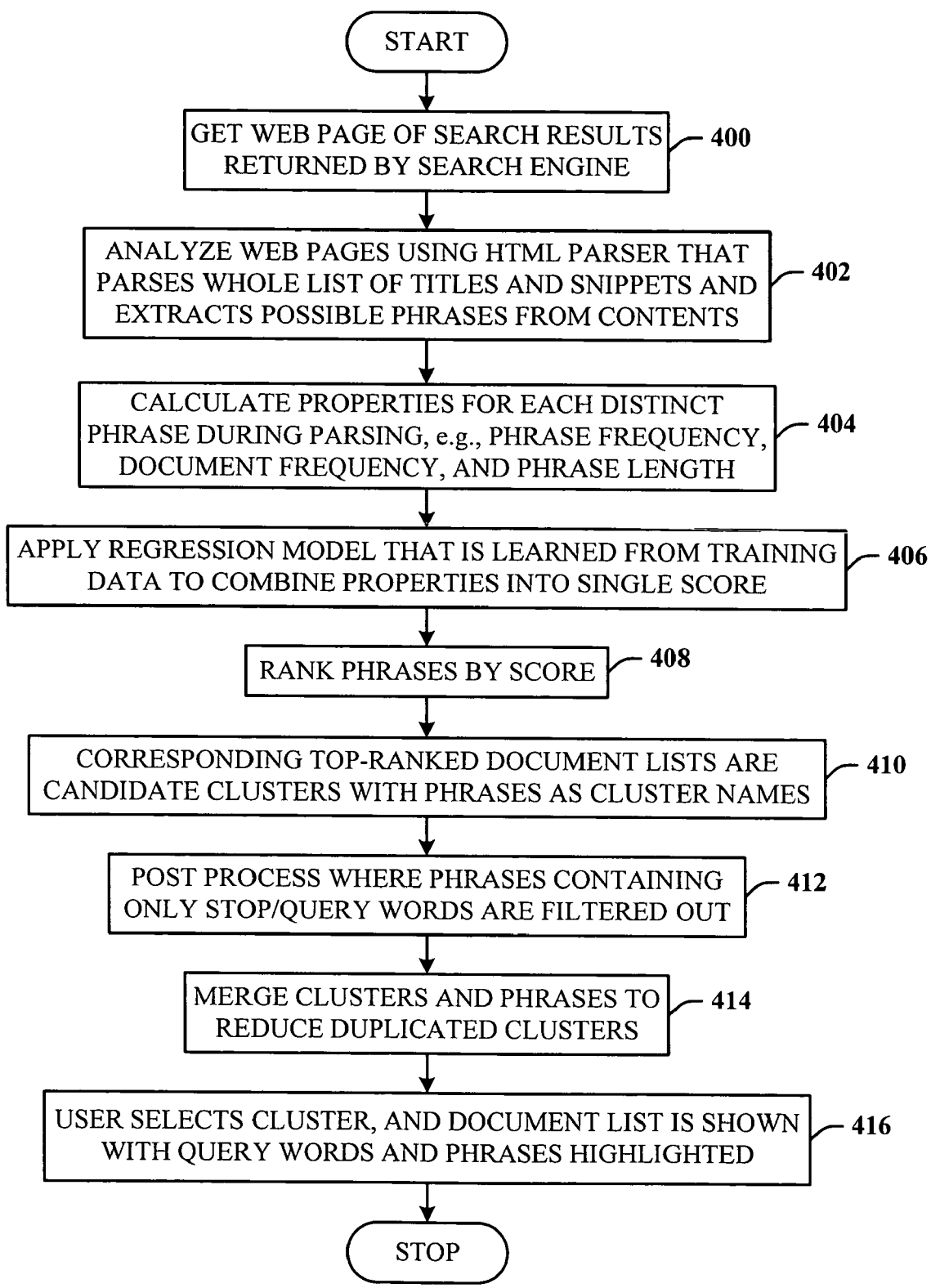
FIG. 4 illustrates a flow chart of one methodology for search result clustering and naming in accordance with the present invention.

Referring now to FIG. 4, there is illustrated a flow chart of one methodology for search result clustering and naming in accordance with the present invention. Generally, the search result clustering problem is reformalized as a salient phrases ranking problem. Thus, an unsupervised clustering problem is converted to a supervised learning problem. Given a query and the ranked list of search results, a whole list of titles and snippets is parsed, all possible phrases (n-grams) are extracted from the contents, and several properties are calculated for each phrase, e.g., phrase frequencies, document frequencies, and phrase length. A regression model learned from training data that is collected in advance is then applied to combine these properties into a single salience score. The phrases are ranked according to the salience score, and the top-ranked phrases are taken as salient phrases. The salient phrases are, in fact, the names of candidate clusters, which are further merged according to their corresponding documents.

Problem Formalization and Algorithm

The disclosed invention converts the conventional unsupervised clustering problem into a supervised ranking problem. More precisely, consider an original ranked list of search results R={r(*d*ᵢ|*q*)}, where q is current query, $d_i$ is a document, and r is some (unknown) function which calculates the probability that $d_i$ is relevant to q. Traditional clustering techniques attempt to find a set of topic-coherent clusters C according to query q. Each cluster is associated with a new document list, according to the probability that $d_i$ is relevant to both q and current cluster:

C={$R_j$}, where $R_j$={$r(d_i|q, R_j)$}.

In contrast, our method seeks to find a ranked list of clusters C', with each cluster associated with a cluster name, as well as, a new ranked list of documents:

C'={$r'(c_k,R_k|q)$}, where $R_k$={$r(d_i|q,c_k)$}.

As shown from the above equations, the present invention modifies the definition of clusters by adding cluster names $c_k$, and emphasizes the ranking thereof by a function r', in order to improve the readability of clusters. Since the requirement of topic-coherence of clusters is eliminated, the complexity of the algorithm is substantially reduced. Non-topic coherence is not a drawback of the present invention because it does not affect the efficiency of user browsing behavior.

Generally, the algorithm of the present invention is composed of the four parts: search result fetching, document parsing and phrase property calculation, salient phrase ranking, and post-processing.

More specifically, at 400, a page (e.g., a web page) of search results is returned by a search engine. At 402, the web pages can be analyzed by an HTML (HyperText Markup Language) parser and result items are extracted. Generally, there are only titles and query-dependent snippets available in each result item. It is assumed that these result item contents are sufficiently informative because most search engines are well designed to facilitate a user's relevance judgment only by the title and snippet. Thus, the engine is capable of presenting the most relevant contents for a given query. Each extracted phrase is in fact the name of a candidate cluster, which corresponds to a set of documents that contain the phrase. At 404, several properties for each distinct phrase are calculated during the parsing, including but not limited to, phrase frequency, document frequency, and phrase length. These properties are described in greater detail hereinbelow.

In the parsing process, titles, and snippets are weighted differently, since it is assumed that there is a higher probability that salient phrases occur in titles. Thus, for example, keywords occurring in a title can be weighted higher. Stemming is applied to each word using Porter's algorithm. The stop words are included in n-gram generation, so that they could be shown when they are adjacent to meaningful keywords in cluster names. In post-processing, pure stop words are filtered out. For the same reason, the query words are also included in the parsing but are filtered out in the post-processing. Given the properties, a regression model is utilized that is learned from training data collected in advance, to combine these properties into a single salience score, as indicated at 406. At 408, the salience phrases are then ranked by the score in descending order. After salient phrases are ranked, the corresponding document lists constitute the candidate clusters, with the salient phrases being cluster names, as indicated at 410.

At 412, in post-processing, the phrases that contain only stop words or the query words are filtered out. At 414, the clusters and phrases are merged to reduce duplicated clusters. Specifically, if the overlapped part of two clusters exceeds a certain threshold, they are merged into one cluster. Meanwhile, the cluster names are adjusted according to the new generated cluster. Finally, the topmost clusters are shown to user.

At 416, when a user selects a cluster, the corresponding document list is shown to the user, with both query words and salient phrases highlighted. This document list could be in the original order, or be re-ranked according to the associated salient phrase. The process then reaches a Stop block.

Figure 5:
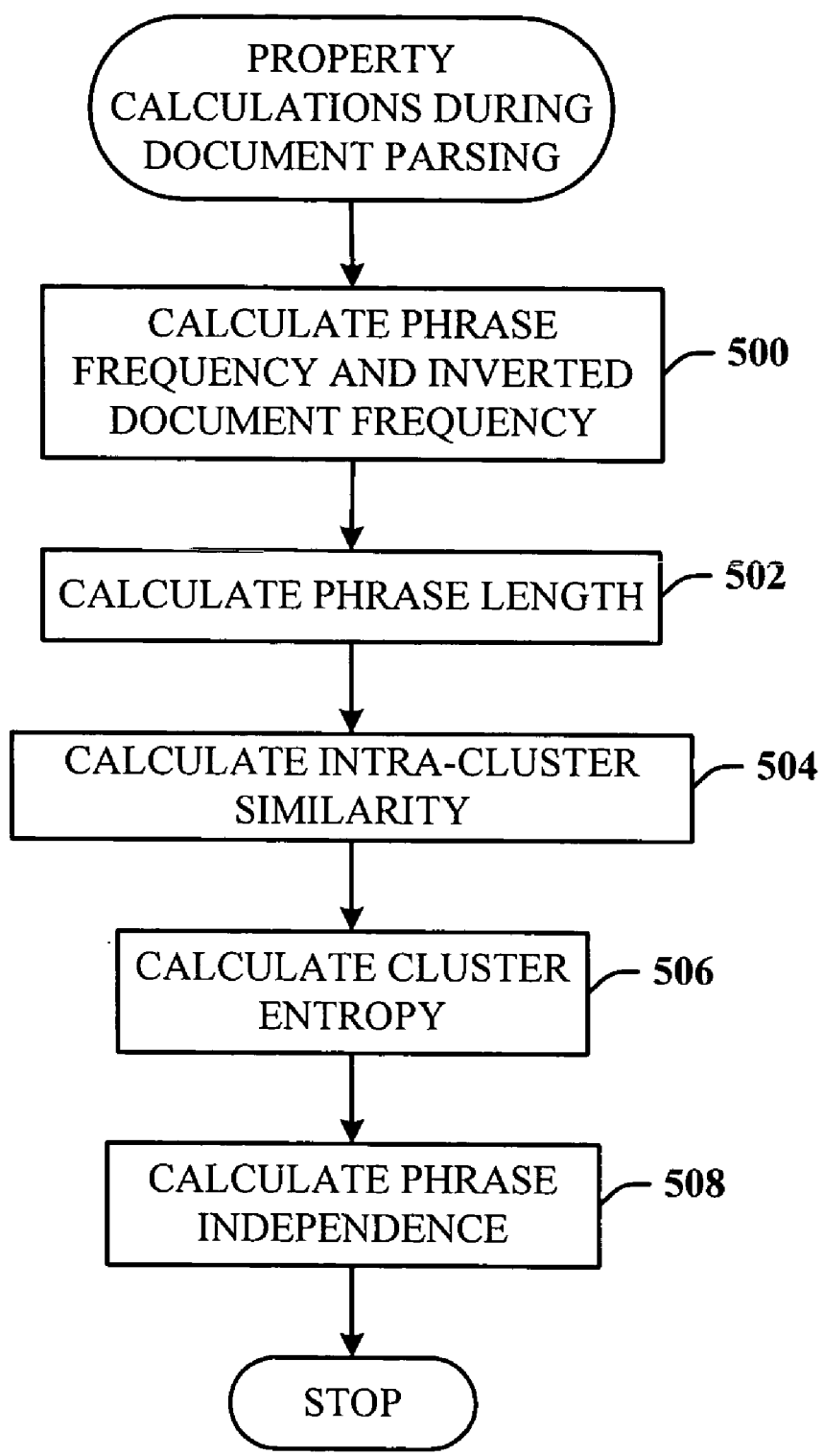
FIG. 5 illustrates a flow chart of one methodology for calculating properties during document parsing in accordance with the present invention.

Referring now to FIG. 5, there is illustrated a flow chart of one methodology for calculating properties during document parsing in accordance with the present invention. Listed are five properties that are calculated during document parsing. These properties are relative to the salience score of phrases. In the following description, the current phrase (an n-gram) is denoted w, and the set of documents that contains w is denoted D(w).

At 500, the phrase frequency and inverted document frequency is calculated just as the traditional meaning of Term Frequency/Inverted Document Frequency (TFIDF).

$$TFIDF = f(w) \cdot \log \frac{N}{|D(w)|}$$

where f represents frequency calculation.

At 502, the phrase length is calculated. Intuitively, more frequent phrases are more likely to be better candidates of salient phrases, while phrases with higher document frequency might be less informative to represent a distinct topic.

The phrase length property (denoted by LEN) is simply the count of words in a phrase. For example, LEN("big")=1 and LEN("big cats")=2. Generally, a longer name is preferred for user browsing.

$$LEN = n$$

Intuitively, if a phrase is a good representation of a single topic, the documents that contain the phrase will be similar to each other. At 504, Intra-Cluster Similarity (ICS) is used to measure the content compactness of documents that contain the phrase. First, documents are converted into vectors in the vector space model: $d_i = (x_{i1}, x_{i2}, \ldots)$. Each component of the vectors represents a distinct unigram, and is typically weighted by TFIDF. For each candidate cluster, its centroid is calculated as follows:

$$o = \frac{1}{|D(w)|} \sum_{d_i \in D(w)} d_i.$$

ICS is calculated as the average cosine similarity between the documents and the centroid. Accordingly, $$ICS = \frac{1}{|D(w)|} \sum_{d_i \in D(w)} \cos(d_i, o).$$

At 506, Cluster Entropy (CE) is employed to represent the distinctness of a phrase. For given phrase w, the corresponding document set D(w) might overlaps with other document sets $D(w_i)$ where $w_i \neq w$. At one extreme, if D(w) is evenly distributed in $D(w_i)$, w might be a too general phrase to be a good salient phrase. At the other extreme, if D(w) seldom overlaps with $D(w_i)$, w may have some distinct meaning. Consider a query "jaguar", for example. The terms "big cats" seldom co-occur with other salient keywords such as "car", "mac os", etc. Therefore, the corresponding documents can constitute a distinct topic. However, "clubs" is a more general keyword which can occur with both "car" and "mac os", thus it will have a less salience score.

CE is defined as follows, where 0·log 0=0.

$$CE = -\sum_t \frac{|D(w) \cap D(t)|}{|D(w)|} \log \frac{|D(w) \cap D(t)|}{|D(w)|}.$$

At 508, phrase independence is calculated. According to the ranked list of clusters C' described hereinabove, a phrase is independent when the entropy of its context is high (i.e., the left and right contexts are sufficiently random). IND is used to measure the independence of phrases. Following is the equation for $IND_l$ that is the independence value for left context, where l(w) is the set of surrounding words immediately left to w.

$$IND_l = -\sum_{t \in l(w)} \frac{f(t)}{TF} \log \frac{f(t)}{TF}.$$

The $IND_r$ value for right context could be calculated similarly. The final IND value is the average of those two.

$$IND = \frac{IND_l + IND_r}{2}.$$

Regression Learning to Rank Salient Phrases

Given the above properties, a single formula could be utilized to combine the properties and calculate a single salience score for each phrase. However, this can be too heuristic to be adaptive for different domains. In accordance with the present invention, however, some training data is utilized to learn a regression model.

Regression is a classic statistical problem which tries to determine the relationship between two random variables $x=(x_1, x_2, \ldots, x_p)$ and y. In this case, the independent variable x can be just the vector of the properties (e.g., five, as indicated hereinabove): x=(TFIDF, LEN, ICS, CE, IND), and the dependent y can be any real-valued score. Salient keywords are sorted in a descending order using y, thus, the most salient keywords are shown on the top.

Several regression models could be used, such as linear regression, logistic regression and support vector regression, for example. These are summarized below, and the effectiveness of each will be compared.

Linear Regression

Linear regression attempts to explain the relationship of x and y with a straight line fit to the data. The linear regression model postulates that:

$$y = b_0 + \sum_{j=1}^{p} b_j x_j + e,$$

where the "residual" e is a random variable with mean zero. The coefficients $b_j (0 \leq j \leq p)$ are determined by the condition that the sum of the square residuals is as small as possible. The variables $x_j$ can come directly from inputs, or some transformations, such as log or polynomial, of inputs.

Logistic Regression

When the dependent variable y is a dichotomy, logistic regression is more suitable because it is desired to predict not a precise numerical value of a dependent variable, but rather the probability that it is one, rather than zero (p=P(y=1)).

Logistic regression attempts to find coefficients $b_j(0 \leq j \leq p)$ to fit x to a logistic transformation of the probability, which is also called logit.

$$\text{logit}(p) = \log \frac{p}{1-p} = b_0 + \sum_{j=1}^{p} b_j x_j + e.$$

Whereas p can only range from zero to one, logit(p) ranges from negative infinity to positive infinity. Instead of using a least-squared deviations criterion for the best fit, logistic regression uses a maximum likelihood method, which maximizes the probability of getting the observed results given the regression coefficients.

Support Vector Regression

In support vector regression, the input x is first mapped onto a high dimensional feature space using some nonlinear mapping, and then a linear model is constructed in this feature space. Support vector regression uses a new type of loss function called $\epsilon$-insensitive loss function, defined as follows:

$$L_\epsilon(y, f(x, \omega)) = \begin{cases} 0 & \text{if } |y - f(x, \omega)| \leq \varepsilon \\ |y - f(x, \omega)| - \varepsilon & \text{otherwise} \end{cases}$$

Support vector regression attempts to minimize $\|\omega\|^2$. This can be described by introducing (non-negative) slack variables $\xi_i, \xi^*_i$, where i=1, ..., n, to measure the deviation of training samples outside $\epsilon$-insensitive zone. Thus, support vector regression is formalized as minimization of the following functional:

$$\min \frac{1}{2}\|\omega\|^2 + C \sum_{i=1}^{n} (\xi_i + \xi^*_i)$$

$$\text{s.t.} \begin{cases} y_i - f(x_i, \omega) \leq \varepsilon + \xi^*_i \\ f(x_i, \omega) - y_i \leq \varepsilon + \xi_i \\ \xi_i, \xi^*_i \geq 0, i = 1, \ldots, n \end{cases}$$

This optimization problem can be transformed into the dual problem so that non-linear kernel functions can be used to perform non-linear regression.

Support vector regression is one form of many different artificial intelligence (AI) based schemes that can be employed for carrying out various aspects thereof.

Another AI-based technique that can be employed for ranking the calculated properties can be facilitated via an automatic classifier system and process.

A classifier is a function that maps an input attribute vector, x=(x1, x2, x3, x4, xn), to a confidence that the input belongs to a class, that is, f(x)=confidence(class). Such classification can employ a probabilistic and/or statistical-based analysis (e.g., factoring into the analysis utilities and costs) to prognose or infer an action that a user desires to be automatically performed. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated from the subject specification, the subject invention can employ classifiers that are explicitly trained (e.g., via a generic training data) as well as implicitly trained (e.g., via observing user behavior, receiving extrinsic information). For example, SVM's are configured via a learning or training phase within a classifier constructor and feature selection module.

Effectiveness Data

Referring now to FIG. 6, there is illustrated a screenshot 600 of one example of a sample search result utilizing clustering in accordance with the present invention. In the sample operation, the system accepts query inputs from users and can pass the query to one or more of many different search engines, e.g., Google™, MSN™, and AltaVista™. In this sample, the search engine used was MSN. The default result numbers are set to 200. This system is used for both training data collection and algorithm evaluation.

In the parsing, all n-grams are extracted from the documents where $n \leq 3$, and the phrases with frequency no greater than three times are considered as noise, and filtered out.

A conventional support vector machine denoted as SVM-Light was used with the options "–z r" to perform support vector regression. In all the support regression experiments, the parameters C and $\epsilon$ are set to default.

Traditional clustering algorithms are difficult to be evaluated. However, with regard to the methodology of the present invention, evaluation is relatively easy, since the problem is defined to be a ranking problem. Thus, classical evaluation methods in Information Retrieval can be used.

Precision (P) is used at top N results to measure the performance, and is defined as follows:

$$P@N = \frac{|C \cap R|}{|R|},$$

where R is the set of top N salient keywords returned by our system, and C is the set of manually tagged correct salient keywords. For evaluation, P@5, P@10, and P@20 are used.

Three human evaluators to label ground truth data for thirty queries. The thirty queries were selected from a one-day query log of the MSN search engine. Specially, three types of queries were selected: ambiguous queries, entity names, and general terms, since these queries are more likely to contain multiple sub-topics and will benefit more from clustering search results. The thirty queries are listed in Table 1.

TABLE 1

| Thirty queries selected from query log Type Queries | |
|---|---|
| Type | Queries |
| Ambiguous queries | jaguar, apple, saturn, jobs, jordan, tiger, trec, ups, quotes, matrix |
| Entity names | susan dumais, clinton, iraq, dell, disney, world war, ford |
| General terms | health, yellow pages, maps, flower, music, chat, games, radio, jokes, graphic design, resume, time zones, travel |

For each query, all the n-grams ($n \leq 3$) are extracted from the search results as candidate phrases, which are ordered alphabetically, and show them to the evaluators. There are one or two hundred candidate phrases for each query. The three human evaluators were asked to first browse through all search results returned by the system, and then select from the candidates ten good phrases (assigning scores one hundred) and ten medium phrases (assigning scores to fifty). The scores of the other phrases are zero. Finally, the three scores are added together and assigned one to the y values of phrases with score greater than one hundred, and assigned zero to the y values of others. In order to facilitate the comparison of the three regression models, only zero or one are assigned to they values; however, it is noted that the testing the output of the regression model ranges from zero to one in logistic regression, and ranges from negative infinity to positive infinity in other regressions.

The manually selected phrases often fail to match against the generated phrases because of some minor differences. Here, each manually tagged phrase is stored as a sequence of word stems, with stop words removed. Generated phrases are processed in the same way before performing exact matching.

The different properties and different learning methods are now compared for salient phrases ranking.

Figure 7:
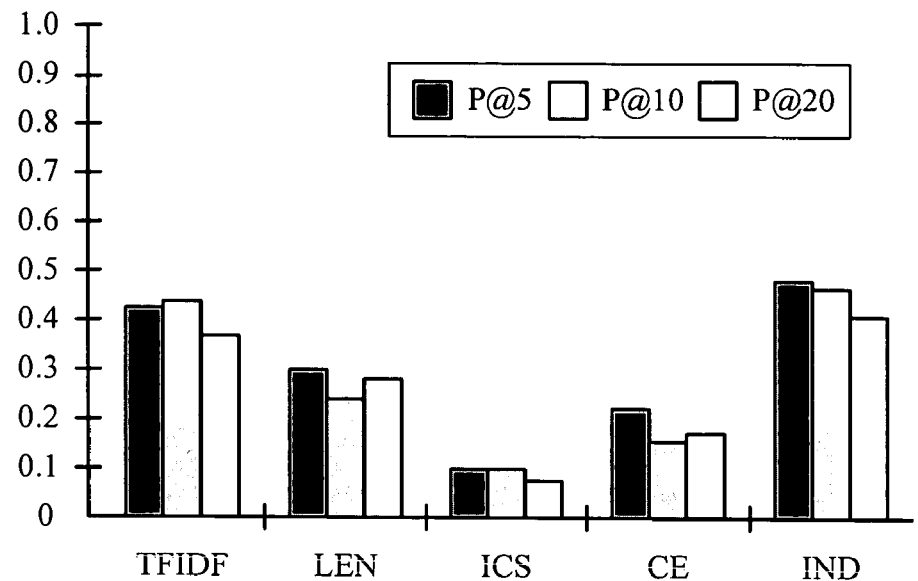
FIG. 7 illustrates a chart that shows a property comparison for the performance of each single property calculated in accordance with the present invention.

Referring now to FIG. 7, there is illustrated a chart 700 that shows a property comparison for the performance of each single property calculated in accordance with the present invention. Each single property is used to rank phrases and evaluate the precisions for all thirty queries for average precisions of top five, top ten, and top twenty. Note that many phrases have the same LEN value, so TFIDF is used as secondary ranking criterion in the evaluation of LEN.

As illustrated, it can be seen that each property does not work very well alone, but IND (P@5=47.4%) and TFIDF (P@5=41.4%) are better indicators for the phrase salience score. It is noted that ICS is not as good an indicator, for the reason that documents are composed of short titles and snippets, and thus, the similarity between documents cannot be measured accurately only by their content.

Figure 8:
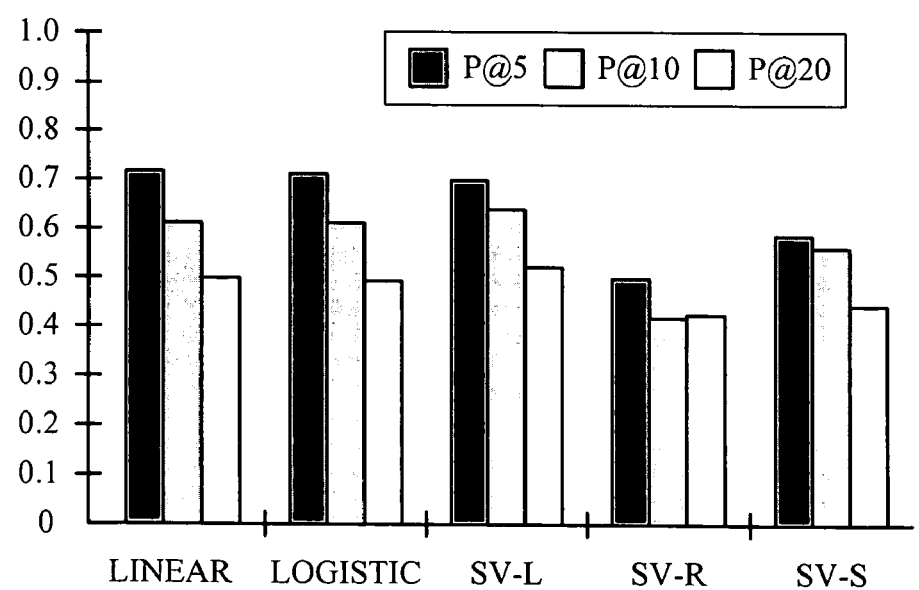
FIG. 8 illustrates a chart that shows a performance comparison for different regression learning methods in accordance with the present invention.

Referring now to FIG. 8, there is illustrated a chart 800 that shows a performance comparison for different regression learning methods in accordance with the present invention. The ground-truth data is randomly partitioned into three parts, and three-fold cross validation is used to evaluate the average performance of linear regression, logistic regression, and support vector regression. For support vector regression, different kernel functions are used: linear kernel (denoted by SV-L), RBF kernel (denoted by SV-R) and sigmoid tanh kernel (denoted by SV-S).

Regression provides significant improvement on the precision compared to any single property. For example, the P@5 of linear regression is 73.3%, and outperforms about 30% over the best precision when using single property IND. The performance of linear regression (P@5=73.3%), logistic regression (P@5=72%) and support vector regression with linear kernel (P@5=71.3%) are almost same. This shows the linearity of the problem to be solved.

The coefficients of one of the linear regression models are recorded as follows:

$$y = -0.427 + 0.146 \times TFIDF + 0.241 \times LEN - 0.022 \times ICS + 0.065 \times CE + 0.266 \times IND$$

In the above equation, each single property is normalized by its corresponding maximal value, so that it can be observed which property plays a more important role in the linear combination. From the above equation, it can be seen that the IND, LEN, and TFIDF are more important than the other properties. The coefficient of ICS is even negative, which also indicates that the content-based similarity has a small impact on the salient phrase ranking.

Figure 9:
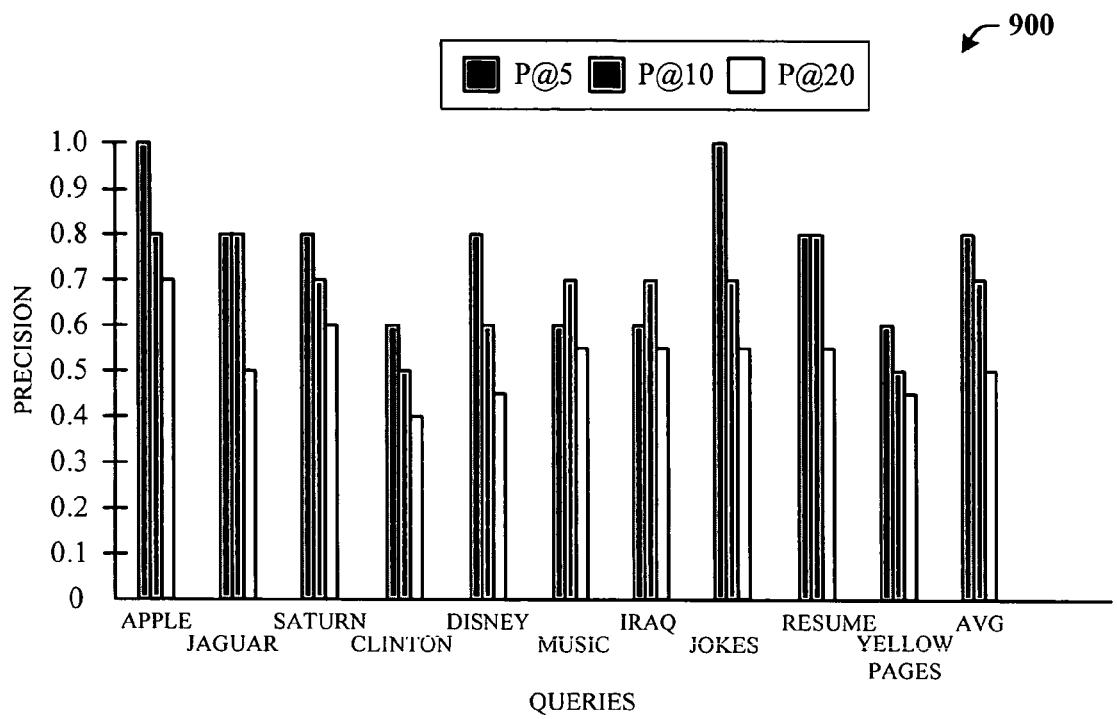
FIG. 9 illustrates a chart that shows the individual ranking precision performance of support vector regression (linear kernel) for various queries in accordance with the present invention.

Referring now to FIG. 9, there is illustrated a chart 900 that shows the individual ranking precision performance of support vector regression (linear kernel) for various queries in accordance with the present invention. The individual ranking precision for ten example queries is shown, and where the rest of queries are used as training data. The X-axis is the ten queries with the average of them at the right-most column. It can be seen that the performance depends heavily on the search results returned by search engine. For some queries, such as "apple" and "jokes", the search engine results are mainly in a single domain (most results for "apple" are about computer). Therefore, the vocabularies are relatively limited, and the salient phrases can be extracted precisely. However, for queries like "Clinton" and "yellow pages", the search engine results contain various vocabularies. Thus, the performance for these is relatively low.

Figure 10:
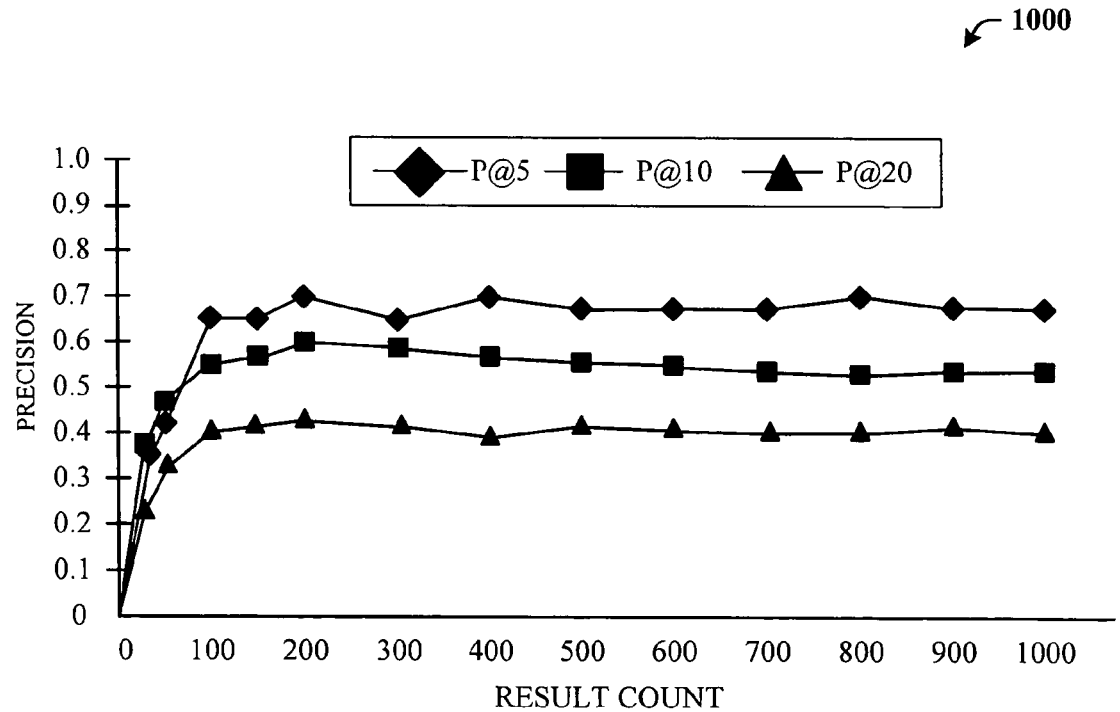
FIG. 10 illustrates a chart that shows a performance curve versus the number of returned documents in accordance with the present invention.

Referring now to FIG. 10, there is illustrated a chart 1000 that shows a performance curve versus the number of returned documents in accordance with the present invention. The precision of one query is also used to explain the reason why the top two hundred search results are used as a basic document set. It is clear that the three precision measures arrive at a peak when the result count is equal to two hundred. Although the training set is based on two hundred search results, FIG. 10 still effectively shows that the algorithm will only require a small number of documents to achieve good performance.

Figure 11:
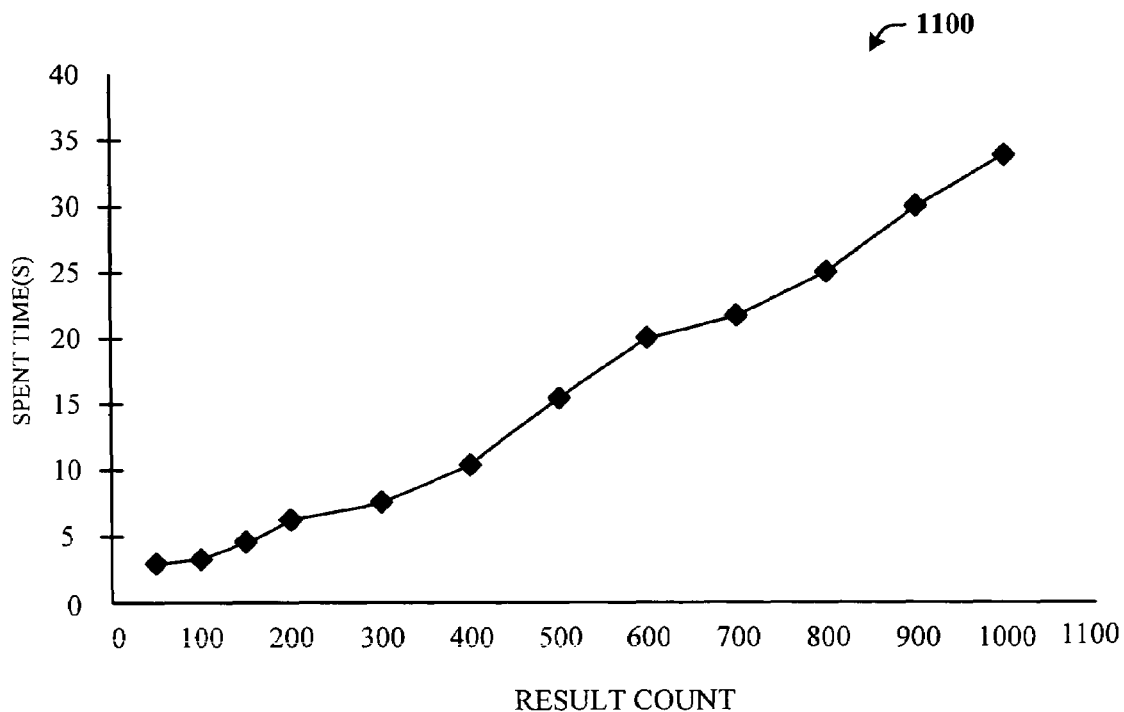
FIG. 11 illustrates a chart that shows time complexity analysis for a query in accordance with the present invention.

Referring now to FIG. 11, there is illustrated a chart 1100 that shows time complexity analysis for a query in accordance with the present invention. A query is selected as an example and the time complexity of the algorithm is analyzed, in which the X-axis stands for the number of results returned from the original search engine, and the Y-axis is the time spent in the whole algorithm (in seconds). Support vector regression is chosen as the regression model. The program code is not optimized, and the time values in this figure are the total processing time, including Web page parsing. However, it can still be observed that the time complexity is approximately linear.

Figure 12:
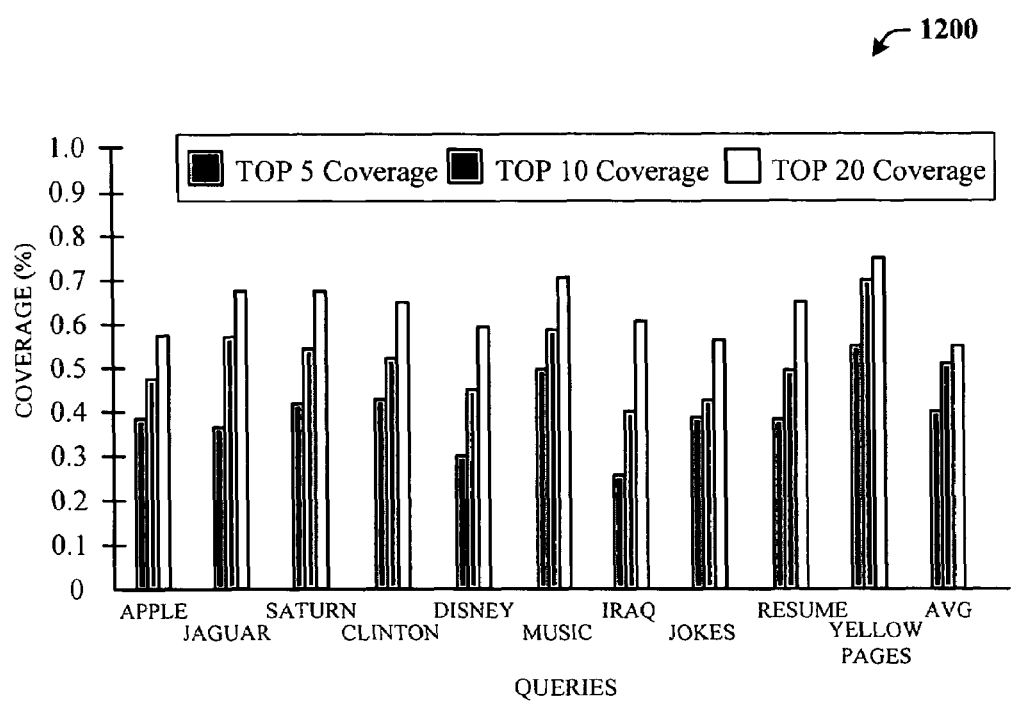
FIG. 12 illustrates a chart that shows the coverage of clusters generated by an algorithm for ten queries in accordance with the present invention.

Referring now to FIG. 12, there is illustrated a chart 1200 that shows the coverage of clusters generated by an algorithm for ten queries in accordance with the present invention. The X-axis is the ten queries with their average (AVG) at the right-most column. It can be seen that, on average, the clusters of the top ten salient phrases contain about half of the search results.

Query Example

Three queries are selected from three types of queries, e.g., "jaguar" from ambiguous queries, "iraq" from entity names, and "resume" from general terms. For the three queries, the top ten salient phrases and the corresponding top five document titles are listed. For each salient phrase, its occurrence frequency is shown in parenthesis.

| Clustering results for "jaguar" | |
| --- | --- |
| 1. car (43) | 1. Factory Car Audio Repair For All Makes and Models . . . |
| | 2. Factory Car Audio Repair For All Makes and Models . . . |
| | 3. Jaguar - Classic cars for sale, classified ads, muscle cars, . . . |
| | 4. Jaguar Cars |
| | 5. Jaguar Cars |
| 2. panthera onca (18) | 1. Jaguar (Panthera onca) |
| | 2. Jaguar - Panthera onca |
| | 3. Jaguar (Panthera onca) |
| | 4. CSG Species Accounts: Jaguar (Panthera onca) |
| | 5. jaguar |
| 3. atari jaguar (13) | 1. Atari Jaguar FAQ |
| | 2. AtariAge - Atari Jaguar Rarity Guide Search |
| | 3. Game Winners - Atari Jaguar cheats, codes, hints, . . . |
| | 4. The Atari Times - Jaguar |
| | 5. AtariAge - Atari Jaguar History |
| 4. mac os (13) | 1. Apple - Mac OS X |
| | 2. Apple - Mac OS X - Overview |
| | 3. Mac OS X 10.2 Jaguar - Page 1 - (September 2002) - 10.2/. . . |
| | 4. Jaguar, next major Mac OS X update coming this . . . |
| | 5. MacNN|Feature: Mac OS X 10.2 Jaguar Report |
| 5. jaguar club (14) | 1. Jaguar Drivers Club (JDC) - Based at Luton, England. |
| | 2. Jaguar Clubs of North America |
| | 3. Jaguar Club of Florida |
| | 4. Jaguar car club in Seattle, Home of JDRCNWA |
| | 5. JEC Homepage |
| 6. models (21) | 1. Jaguar Models - Main Page (resin model kits) |
| | 2. Factory Car Audio Repair For All Makes and Models . . . |
| | 3. Factory Car Audio Repair For All Makes and Models . . . |
| | 4. Jaguar automobile history and database - main index |
| | 5. Autobytel Jaguar Search Results |
| 7. jaguar history (8) | 1. Jaguar automobile history and database - main index |
| | 2. Jaguar History |
| | 3. Jaguar History |
| | 4. AtariAge - Atari Jaguar History |
| | 5. Defending the Land of the Jaguar: A History of . . . |
| 8. cats (16) | 1. Race for the Big Cats from Care2.com and WCS |
| | 2. Racing Cats :: The unofficial Jaguar F1 Fan Site |
| | 3. Race for the Big Cats - Tiger, Jaguar and Snow . . . |
| | 4. Jaguar |
| | 5. jaguar |
| 9. animal (8) | 1. Animal Fact Sheets |
| | 2. Yahooligans! Animals: Jaguar |
| | 3. Animal Spirit Guides Shamanism |
| | 4. Jaguar - Kids' Planet - Defenders of Wildlife |
| | 5. Jaguar Posters & Art Prints - Your Purchase . . . |
| 10. jaguar enthusiasts (7) | 1. Mac OS X 10.2 Jaguar - Page 1 - (September 2002) . . . |
| | 2. E-Type Lovers |
| | 3. Carlynx - Jaguar, Jaguars, Jaguar Links. |
| | 4. Jaguar |
| | 5. Jaguar Clubs of North America |

| Clustering results for "resume" | |
| --- | --- |
| 1. cover letter (31) | 1. JobStar--Resumes & Cover Letters |
| | 2. Resume and Cover Letter Services by Resume to Referral |
| | 3. ResumeZapper.com - E-Mail your Resume and Cover . . . |
| | 4. The Resume Guide, homepage for Susan Ireland's resume, . . . |
| | 5. A and A Resume Services - resume and cover letter writing . . . |
| 2. job (50) | 1. Employment 911 - Job Search, Resume Posting, Job Posting, . . . |
| | 2. Post Your Resume--Let the Job Find You - FlipDog.com |
| | 3. Computer Jobs and Technical Employment for Computer . . . |
| | 4. Resume Writing Tips - 60 Free Resume and Job Search . . . |
| | 5. The Resume Guide, homepage for Susan Ireland's resume, . . . |
| 3. resume writing (37) | 1. RESUME WRITING|How to write a masterpiece of a resume |
| | 2. A and A Resume Services - resume and cover letter writing . . . |
| | 3. Resume Writing Tips - 60 Free Resume and Job Search . . . |
| | 4. JobWeb - Your Guide to Resume Writing |
| | 5. #1 Resume Writing Services & Resume Tips Resource Center |
| 4. services (40) | 1. Resume and Cover Letter Services by Resume to Referral |
| | 2. #1 Resume Writing Services & Resume Tips Resource Center |

| Clustering results for "resume" | |
|---|---|
| | 3. Resume Writing Service<br>4. A and A Resume Services - resume and cover letter writing . . .<br>5. Preparing Your Resume - advice on quality resume . . . |
| 5. employment (15) | 1. Computer Jobs and Technical Employment for Computer . . .<br>2. Employment 911 - Job Search, Resume Posting, Job Posting, . . .<br>3. Resumes, Jobs, Employment and Career Resources<br>4. InternJobs.com Reach Internship Employers with Your Resume<br>5. ZenSearch.com - e-Shopping Guide - Money & Employment . . . |
| 6. professional resume (14) | 1. Preparing Your Resume - advice on quality resume reparation . . .<br>2. Computer Jobs and Technical Employment for Computer . . .<br>3. Resume Writing Service<br>4. Resume Writing<br>5. Chuck Kahn's Resume |
| 7. free resume (14) | 1. Resume Writing Tips - 60 Free Resume and Job Search . . .<br>2. Free Resume Examples and Resume Writers<br>3. Free Resume Examples<br>4. Resume Writing<br>5. earthtimes.org - Sites for resume |
| 8. career (18) | 1. Resumes, Jobs, Employment and Career Resources<br>2. Monster: Career Advice<br>3. Career Kids Links<br>4. Career Center - Resume and Letter Writing<br>5. Employment 911 - Job Search, Resume Posting, Job Posting, . . . |
| 9. resume samples (10) | 1. A and A Resume Services - resume and cover letter writing . . .<br>2. Resume Samples<br>3. Resume and Cover Letter Guide - Sample Resume<br>4. JobWeb - Resumes & Interviews<br>5. JobWeb - Your Guide to Resume Writing |
| 10. experience (16) | 1. JobWeb - Resumes & Interviews<br>2. The Writing Center at Rensselaer Polytechnic Institute<br>3. Chuck Kahn's Resume<br>4. Birds-Eye.Net Owner's (Bruce Bahlmann) Resume<br>5. Resume |

| Clustering results for "iraq" | |
|---|---|
| 1. war (32) | 1. AlterNet: War on Iraq<br>2. War in Iraq - Christianity Today Magazine<br>3. End The War<br>4. Iraq Aftermath: The Human Face of War: AFSC<br>5. NOLA.com: War on Iraq |
| 2. middle east (31) | 1. Middle East Studies: Iraq<br>2. Amnesty International Report 2002 - Middle East and North . . .<br>3. Human Rights Watch: Middle East and Northern Africa: . . .<br>4. Columbus World Travel Guide - Middle East - Iraq - Overview<br>5. Iraq/Middle East |
| 3. map (18) | 1. UT Library Online - Perry-Casta?eda Map Collection - Iraq . . .<br>2. ABC Maps of Iraq; Flag, Map, Economy, Geography, . . .<br>3. Flags of Iraq - geography; Flags, Map, Economy, Geography, . . .<br>4. Lonely Planet - Iraq Map<br>5. Map of Iraq |
| 4. saddam hussein (13) | 1. Iraq Resource Information Site - News History Culture People . . .<br>2. U.S. Department of State - Saddam Hussein's Iraq<br>3. Iraq Crisis - Global Policy Forum - UN Security Council<br>4. New Scientist\|Conflict in Iraq<br>5. Almuajaha - The Iraqi Witness: home |
| 5. human rights (11) | 1. Human Rights Watch: Middle East and Northern Africa: Iraq . . .<br>2. Iraq: Amnesty International's Human Rights Concerns<br>3. Human Rights Watch: Background on the Crisis in Iraq<br>4. Iraq: Amnesty International's Human Rights Concerns for<br>5. Iraq Aftermath: The Human Face of War: AFSC |

-continued

| Clustering results for "iraq" | |
|---|---|
| 6. country (19) | 1. Library of Congress/Federal Research Division/Country . . .<br>2. U.S. Department of State: Iraq Country Information<br>3. Iraq Country Analysis Brief<br>4. ArabBay.com: Arab Countries/Iraq<br>5. Countries: Iraq: Arabic Search Engine: Directory of arabic . . . |
| 7. special report (13) | 1. Guardian Unlimited\|Special reports\|Special report: Iraq<br>2. Operation Iraqi Freedom - A White House Special Report<br>3. RFE/RL Iraq Report<br>4. Amnesty International Report 2002 - Middle East and North . . .<br>5. Ethnologue report for Iraq |
| 8. guide (13) | 1. Lonely Planet World Guide\|Destination Iraq\|Introduction<br>2. Columbus World Travel Guide - Middle East - Iraq - Overview<br>3. Herald.com - Your Miami Everything Guide<br>4. Kansas.com - Your Kansas Everything Guide<br>5. Kansascity.com - Your Kansas City Everything Guide |
| 9. united nations (11) | 1. Mission of Iraq to the United Nations<br>2. united nations<br>3. United for Peace and Justice<br>4. U.S. Department of State: Iraq Country Information<br>5. Iraq Crisis - Global Policy Forum - UN Security Council |
| 10. travel, business (16) | 1. Iraq: Complete travel information to Iraq, travel facts, . . .<br>2. EIN news - Iraq - Political, Business and Breaking . . .<br>3. Iraq - Travel Warning<br>4. Columbus World Travel Guide - Middle East - Iraq - . . .<br>5. Iraq Visa Application - Tourist Visas, Business Visas, . . . |

Figure 13:
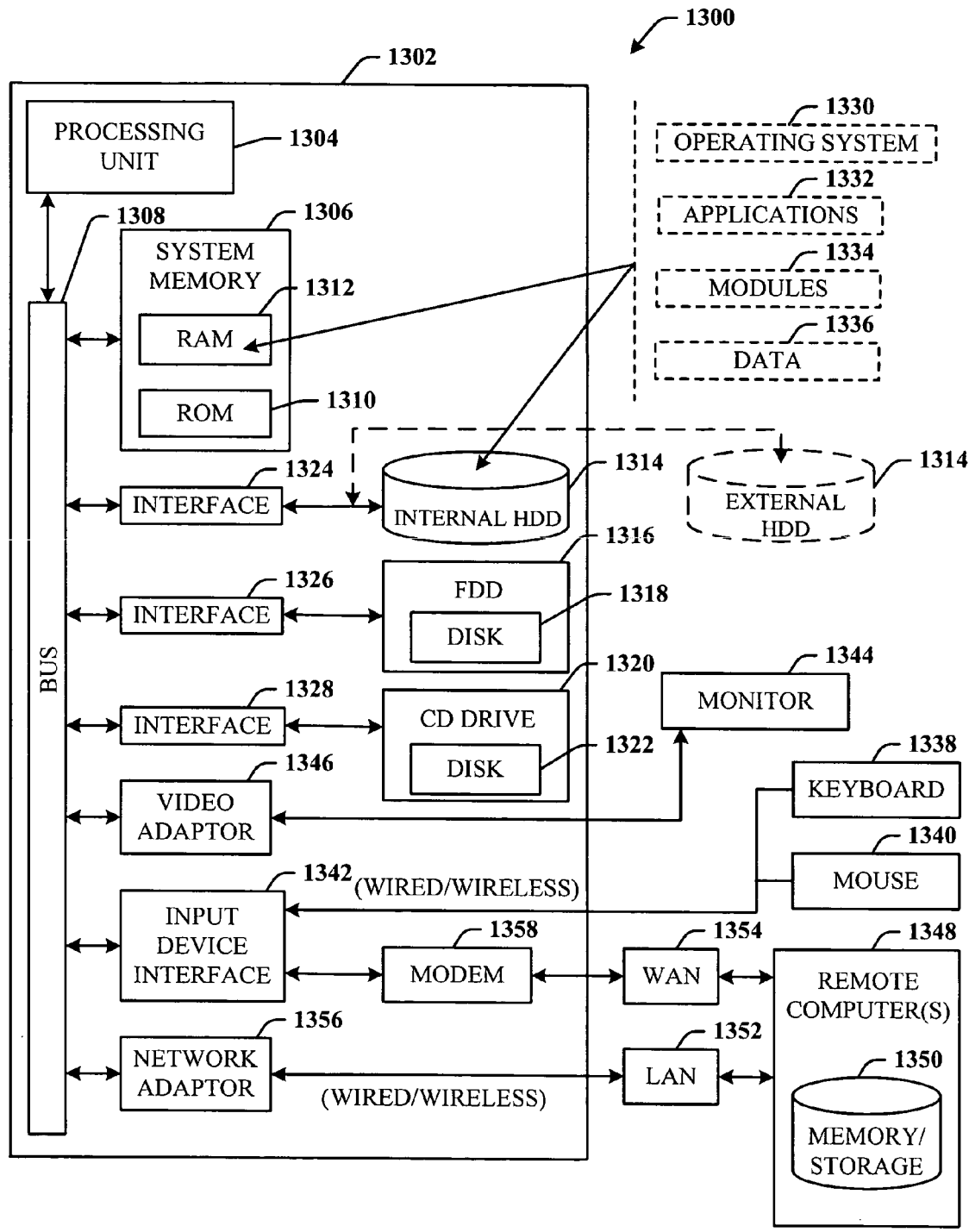
FIG. 13 illustrates a block diagram of a computer operable to execute the disclosed architecture.

Referring now to FIG. 13, there is illustrated a block diagram of a computer operable to execute the disclosed architecture. In order to provide additional context for various aspects of the present invention, FIG. 13 and the following discussion are intended to provide a brief, general description of a suitable computing environment 1300 in which the various aspects of the present invention can be implemented. While the invention has been described above in the general context of computer-executable instructions that may run on one or more computers, those skilled in the art will recognize that the invention also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the invention may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and nonvolatile media, removable and non-removable media. By way of example, and not limitation, computer readable media can comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

With reference again to FIG. 13, there is illustrated an exemplary environment 1300 for implementing various aspects of the invention that includes a computer 1302, the computer 1302 including a processing unit 1304, a system memory 1306 and a system bus 1308. The system bus 1308 couples system components including, but not limited to, the system memory 1306 to the processing unit 1304. The processing unit 1304 can be any of various commercially available processors. Dual microprocessors and other multi-processor architectures may also be employed as the processing unit 1304.

The system bus 1308 can be any of several types of bus structure that may further interconnect to a memory bus (with or without a memory controller), a peripheral bus, and a local bus using any of a variety of commercially available bus architectures. The system memory 1306 includes read only memory (ROM) 1310 and random access memory (RAM)

1312. A basic input/output system (BIOS) is stored in a non-volatile memory 1310 such as ROM, EPROM, EEPROM, which BIOS contains the basic routines that help to transfer information between elements within the computer 1302, such as during start-up. The RAM 1312 can also include a high-speed RAM such as static RAM for caching data.

The computer 1302 further includes an internal hard disk drive (HDD) 1314 (e.g., EIDE, SATA), which internal hard disk drive 1314 may also be configured for external use in a suitable chassis (not shown), a magnetic floppy disk drive (FDD) 1316, (e.g., to read from or write to a removable diskette 1318) and an optical disk drive 1320, (e.g., reading a CD-ROM disk 1322 or, to read from or write to other high capacity optical media such as the DVD). The hard disk drive 1314, magnetic disk drive 1316 and optical disk drive 1320 can be connected to the system bus 1308 by a hard disk drive interface 1324, a magnetic disk drive interface 1326 and an optical drive interface 1328, respectively. The interface 1324 for external drive implementations includes at least one or both of Universal Serial Bus (USB) and IEEE 1394 interface technologies.

The drives and their associated computer-readable media provide nonvolatile storage of data, data structures, computer-executable instructions, and so forth. For the computer 1302, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods of the present invention.

A number of program modules can be stored in the drives and RAM 1312, including an operating system 1330, one or more application programs 1332, other program modules 1334 and program data 1336. All or portions of the operating system, applications, modules, and/or data can also be cached in the RAM 1312.

It is appreciated that the present invention can be implemented with various commercially available operating systems or combinations of operating systems.

A user can enter commands and information into the computer 1302 through one or more wired/wireless input devices, e.g., a keyboard 1338 and a pointing device, such as a mouse 1340. Other input devices (not shown) may include a microphone, an IR remote control, a joystick, a game pad, a stylus pen, touch screen, or the like. These and other input devices are often connected to the processing unit 1304 through an input device interface 1342 that is coupled to the system bus 1308, but can be connected by other interfaces, such as a parallel port, an IEEE 1394 serial port, a game port, a USB port, an IR interface, etc.

A monitor 1344 or other type of display device is also connected to the system bus 1308 via an interface, such as a video adapter 1346. In addition to the monitor 1344, a computer typically includes other peripheral output devices (not shown), such as speakers, printers etc.

The computer 1302 may operate in a networked environment using logical connections via wired and/or wireless communications to one or more remote computers, such as a remote computer(s) 1348. The remote computer(s) 1348 can be a workstation, a server computer, a router, a personal computer, portable computer, microprocessor-based entertainment appliance, a peer device or other common network node, and typically includes many or all of the elements described relative to the computer 1302, although, for purposes of brevity, only a memory storage device 1350 is illustrated. The logical connections depicted include wired/wireless connectivity to a local area network (LAN) 1352 and/or larger networks, e.g., a wide area network (WAN) 1354. Such LAN and WAN networking environments are commonplace in offices, and companies, and facilitate enterprise-wide computer networks, such as intranets, all of which may connect to a global communication network, e.g., the Internet.

When used in a LAN networking environment, the computer 1302 is connected to the local network 1352 through a wired and/or wireless communication network interface or adapter 1356. The adaptor 1356 may facilitate wired or wireless communication to the LAN 1352, which may also include a wireless access point disposed thereon for communicating with the wireless adaptor 1356. When used in a WAN networking environment, the computer 1302 can include a modem 1358, or is connected to a communications server on the LAN, or has other means for establishing communications over the WAN 1354, such as by way of the Internet. The modem 1358, which can be internal or external and a wired or wireless device, is connected to the system bus 1308 via the serial port interface 1342. In a networked environment, program modules depicted relative to the computer 1302, or portions thereof, can be stored in the remote memory/storage device 1350. It will be appreciated that the network connections shown are exemplary and other means of establishing a communications link between the computers can be used.

The computer 1302 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with conventional network or simply an ad hoc communication between at least two devices.

Wi-Fi, or Wireless Fidelity, allows connection to the Internet from a couch at home, a bed in a hotel room or a conference room at work, without wires. Wi-Fi is a wireless technology like a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, with an 11 Mbps (802.11b) or 54 Mbps (802.11a) data rate or with products that contain both bands (dual band), so the networks can provide real-world performance similar to the basic 10BaseT wired Ethernet networks used in many offices.

Figure 14:
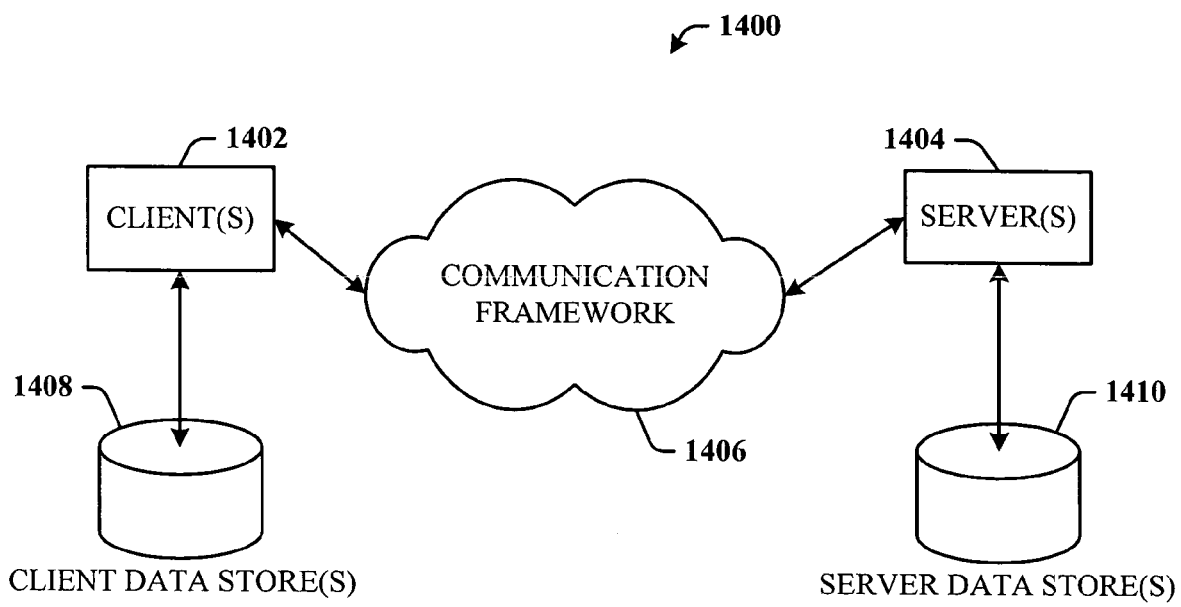
FIG. 14 illustrates a schematic block diagram of an exemplary computing environment in accordance with the present invention.

Referring now to FIG. 14, there is illustrated a schematic block diagram of an exemplary computing environment 1400 in accordance with the present invention. The system 1400 includes one or more client(s) 1402. The client(s) 1402 can be hardware and/or software (e.g., threads, processes, computing devices). The client(s) 1402 can house cookie(s) and/or associated contextual information by employing the present invention, for example. The system 1400 also includes one or more server(s) 1404. The server(s) 1404 can also be hardware and/or software (e.g., threads, processes, computing devices). The servers 1404 can house threads to perform transformations by employing the present invention, for example. One possible communication between a client 1402 and a server 1404 can be in the form of a data packet adapted to be transmitted between two or more computer processes. The data packet may include a cookie and/or associated contextual information, for example. The system 1400 includes a communication framework 1406 (e.g., a global communication network such as the Internet) that can be employed to facilitate communications between the client(s) 1402 and the server(s) 1404.

Communications can be facilitated via a wired (including optical fiber) and/or wireless technology. The client(s) 1402 are operatively connected to one or more client data store(s) 1408 that can be employed to store information local to the client(s) 1402 (e.g., cookie(s) and/or associated contextual information). Similarly, the server(s) 1404 are operatively connected to one or more server data store(s) 1410 that can be employed to store information local to the servers 1404.

What has been described above includes examples of the present invention. It is, of course, not possible to describe every conceivable combination of components or methodologies for purposes of describing the present invention, but one of ordinary skill in the art may recognize that many further combinations and permutations of the present invention are possible. Accordingly, the present invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computer implemented system that facilitates clustering of search results, comprising:
    a memory having stored therein computer-executable instructions configured to implement the clustering system, including:
        an input component that receives search results, wherein the search results are a ranked list of titles and snippets associated with documents;
        an analysis component that:
        utilizes a frequent itemset algorithm to extract keywords from the search results and identifies frequently occurring words as keywords, with keywords occurring in titles being weighted more heavily than keywords occurring in snippets,
        calculates properties for each keyword, wherein the properties include phrase frequency and inverted document frequency, phrase length, intra-cluster similarity, cluster entropy and phrase independence,
        applies a regression model learned from training data that is collected in advance to combine the properties into a salience score for each of the keywords,
        ranks the keywords in descending order according to their associated salience scores and
        selects the highest ranked keywords as salient keywords; and
        a clustering component that:
        generates one or more candidate clusters of the search results according to the saliency score, wherein the salient keywords are selected as names of the candidate clusters, the names of the candidate clusters being phrases when the salient keywords are merged with other salient keywords,
        merges the candidate clusters into one or more final clusters,
        merges a first cluster and a second cluster into a third cluster, when overlap of the first and second clusters exceeds a predetermined threshold,
        adjusts cluster names of the one or more final clusters to generate a new cluster name for the third cluster, and
        outputs the search results as a ranked list of associated documents.

2. The system of claim 1, wherein the ranked list of associated documents is presented in response to selection of a final cluster.

3. The system of claim 1, wherein a document is assigned to the final cluster based upon its similarity to relevant keywords of the final cluster.

4. The system of claim 1, wherein the final cluster is named according to a keyword or phrase that includes multiple keywords.

5. A processor-executable method for processing search results, comprising:
    employing a processor executing computer executable instructions stored on a computer readable storage medium to implement the following search result processing acts:
        receiving a web page of search results from a web search engine, wherein the search results comprise a ranked list of documents;
        parsing the search results;
        extracting phrases from the search results, wherein the phrases include titles and query-dependent snippets, with phrases occurring in titles being weighted more heavily than keywords occurring in query-dependent snippets;
        calculating properties for each phrase, wherein properties include phrase frequency and inverted document frequency, phrase length, cluster entropy and phrase independence;
        applying a trained regression model to combine the properties for each phrase into a single salience score;
        ranking the phrases by the single salience score in descending order, wherein the top-ranked phrases are salient phrases;
        assigning documents to the salient phrases to generate at least one candidate cluster, the name of the at least one candidate cluster being a phrase when a salient keyword is merged with other salient keywords; and
        dynamically generating at least one final cluster of the search results by merging the candidate clusters;
        generating cluster names for the final clusters based on the salient phrases;
        merging a first cluster and a second cluster into a third cluster, when overlap of the first and second clusters exceeds a predetermined threshold; and
        adjusting cluster names of the final clusters to generate a new cluster name for the third cluster.

6. The method of claim 5, wherein an HTML parser is utilized for parsing the search results.

7. The method of claim 5, wherein the titles and snippets are weighted differently in the extraction process.

8. The method of claim 7, wherein the titles are weighted greater than the snippets.

9. The method of claim 5, further comprising automatically presenting an associated document list of a cluster.

10. The method of claim 9, wherein the salient phrases are highlighted in the document list.

11. A computer implemented system that facilitates processing of search results, comprising:

a memory having stored therein computer-executable instructions configured to implement the clustering system, including:
    means for receiving search results that contain titles and snippets of information;
    means for extracting phrases from the search results, with phrases occurring in titles being weighted more heavily than keywords occurring in snippets;
    means for calculating properties for each of the phrases, wherein the properties include phrase frequency and inverted document frequency, phrase length, cluster entropy and phrase independence;
    means for applying a regression model learned from previous training data to process the properties into a salient score for each phrase;
    means for ranking the phrases in descending order according to respective salient scores, wherein the top-ranked phrases are salient phrases;
    means for dynamically generating one or more candidate clusters of the search results, wherein the candidate clusters are labeled by the salient phrases and the names of the candidate clusters being phrases when a salient keyword is merged with other salient keywords;
    means for merging candidate clusters to form final clusters;
    means for merging a first cluster and a second cluster into a third cluster, when overlap of the first and second clusters exceeds a predetermined threshold; and
    means for adjusting cluster names of the final clusters to generate a new cluster name for the third cluster.

12. The system of claim 11, wherein the regression model is a linear regression model, a logistic regression model, a trained support vector regression model or an automatic classifier system.

13. The system of claim 11, further comprising means for presenting a list of documents that are associated with the salient phrases in response to selection of the cluster.

* * * * *